United States Patent
Herrell et al.

(10) Patent No.: US 7,606,995 B2
(45) Date of Patent: Oct. 20, 2009

(54) ALLOCATING RESOURCES TO PARTITIONS IN A PARTITIONABLE COMPUTER

(75) Inventors: Russ Herrell, Fort Collins, CO (US); Gerald J. Kaufman, Jr., Fort Collins, CO (US); John A. Morrison, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 291 days.

(21) Appl. No.: 10/898,590

(22) Filed: Jul. 23, 2004

(65) Prior Publication Data
US 2006/0020769 A1 Jan. 26, 2006

(51) Int. Cl.
G06F 15/00 (2006.01)
(52) U.S. Cl. ........................................ 712/13
(58) Field of Classification Search ................ 712/13
See application file for complete search history.

(56) References Cited

U.S. PATENT DOCUMENTS

| | | | |
|---|---|---|---|
| 4,300,192 A | 11/1981 | Couleur et al. | |
| 4,843,541 A | 6/1989 | Bean et al. | |
| 4,925,311 A | 5/1990 | Neches et al. | |
| 5,117,350 A | 5/1992 | Parrish et al. | |
| 5,129,077 A * | 7/1992 | Hillis ................ | 712/13 |
| 5,193,202 A | 3/1993 | Jackson et al. | |
| 5,210,844 A | 5/1993 | Shimura et al. | |
| 5,319,760 A | 6/1994 | Mason et al. | |
| 5,428,758 A | 6/1995 | Salsburg | |
| 5,522,075 A | 5/1996 | Robinson et al. | |
| 5,561,768 A | 10/1996 | Smith | |
| 5,710,938 A | 1/1998 | Dahl et al. | |
| 5,761,516 A * | 6/1998 | Rostoker et al. .......... | 710/260 |
| 5,765,198 A | 6/1998 | McCrocklin et al. | |
| 6,163,834 A | 12/2000 | Garcia et al. | |
| 6,226,671 B1 | 5/2001 | Hagersten et al. | |
| 6,260,155 B1 | 7/2001 | Dellacona | |
| 6,295,584 B1 | 9/2001 | DeSota et al. | |
| 6,356,991 B1 | 3/2002 | Bauman et al. | |
| 6,446,182 B1 | 9/2002 | Bouraoui et al. | |
| 6,598,130 B2 | 7/2003 | Harris et al. | |

(Continued)

OTHER PUBLICATIONS

Berkeley Design Technology, Inc. "DSP Processors and Cores—The Options Multiply". pp. 1-8, Jun. 1995.*

(Continued)

*Primary Examiner*—Eddie P Chan
*Assistant Examiner*—Robert E Fennema

(57) ABSTRACT

Techniques are provided for allocating a plurality of resources on a chip to a plurality of partitions in a partitionable computer system. In one embodiment, a resource allocated to a first partition generates a physical address in an address space allocated to the first partition. A partition identification value identifies the first partition. The first partition identification value is stored in the first physical address to produce a partition-identifying address, which may be transmitted to a system fabric. In another embodiment, a transaction is received which includes a source terminus identifier identifying a source device which transmitted the transaction. It is determined, based on the source terminus identifier, whether the source device is allocated to the same partition as any of the plurality of resources. If the source device is so allocated, the transaction is transmitted to a resource that is allocated to the same partition as the source device.

22 Claims, 14 Drawing Sheets

U.S. PATENT DOCUMENTS 6,910,108 B2 * 6/2005 Downer et al. .............. 711/141
2003/0110205 A1 6/2003 Johnson

OTHER PUBLICATIONS

Texas Instruments. Multimedia Video Processor (MVP) 320C8X. pp 1-4, Jun. 20, 2002.*

Naude, Frank. "Oracle FAQ: Glossary of Terms: C". "Cache" definition. Jun. 2, 2000.*

Joel M. Tendler, Steve Dodson, Steve Fields, Hung Le, Balaram Sinharoy, IBM e server POWER4 System Microarchitecture, IBM Server Group, Oct. 2001.

The Innovative Features and Advantages of CMP, Unisys, 2001, http://www.unisys.com/hw/servers/es7000/cmp-features.asp.

* cited by examiner

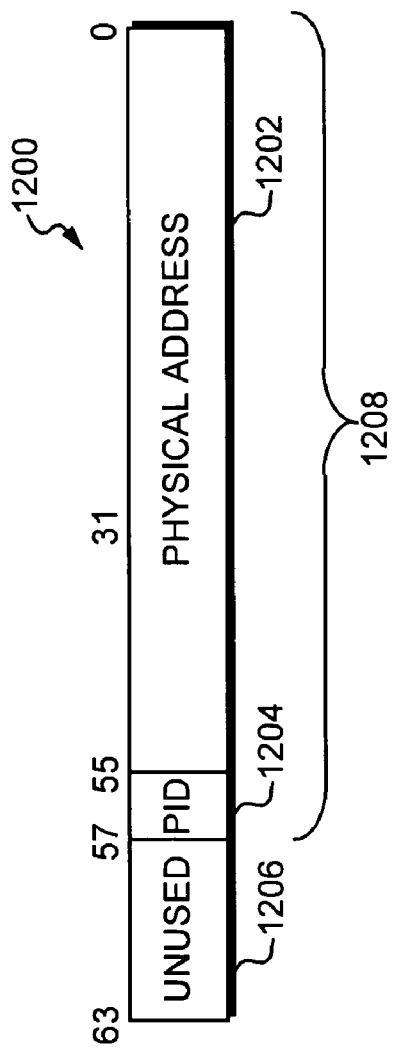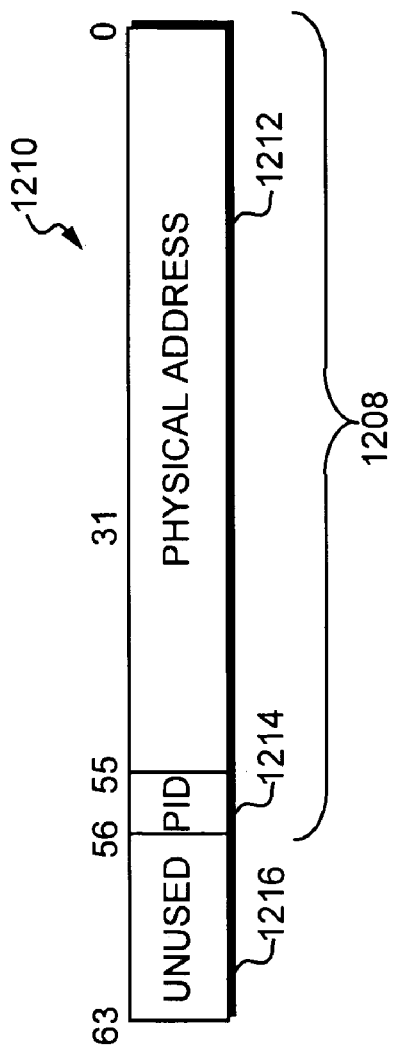

ALLOCATING RESOURCES TO PARTITIONS IN A PARTITIONABLE COMPUTER

BACKGROUND

1. Field of the Invention

The present invention relates to partitionable computers and, more particularly, to techniques for allocating resources to partitions in partitionable computers.

2. Related Art

Computer system owners and operators are continually seeking to improve computer operating efficiencies and hence to reduce the cost of providing computing services. For example, servers of various kinds—such as database servers, web servers, email servers, and file servers—have proliferated within enterprises in recent years. A single enterprise may own or otherwise employ the services of large numbers of each of these kinds of servers. The cost of purchasing (or leasing) and maintaining such servers can be substantial. It would be advantageous, therefore, to reduce the number of servers that must be used by an enterprise without decreasing system performance.

One way to reduce the number of servers is through the process of "server consolidation," in which multiple independent servers are replaced by a single server, referred to herein as a "consolidation server." A consolidation server typically is a powerful computer system having significant computing resources (such as multiple processors and large amounts of memory). The consolidation server may be logically subdivided into multiple "partitions," each of which is allocated a portion of the server's resources. A multi-partition consolidation server is an example of a "partitionable computer." Each partition may execute its own operating system and software applications, and otherwise act similarly to an independent physical computer.

Unlike a collection of independent servers, typically it is possible to dynamically adjust the resources available to each partition/application in a consolidation server. Many applications experience variation in workload demand, which is frequently dependent on time of day, day of month, etc. Periods of high workload demand are frequently not coincident. Applying available resources to current high-demand workloads achieves improved resource utilization, decreased overall resource requirements, and therefore reduced overall cost.

As partitionable computers become more powerful, the trend is for them to include a greater and greater number of processors. In particular, a single partitionable computer typically includes several (e.g., 4) "cell boards," each of which includes several (e.g., 2, 4, 8, or 16) processors. The cell boards are interconnected through a switching-fabric and collectively provide an effective processing power that approaches the aggregate processing power of the individual processors they contain. Each successive generation of cell boards tends to include a greater number of processors than the previous generation.

Early processors, like many existing processors, included only a single processor core. A "multi-core" processor, in contrast, may include one or more processor cores on a single chip. A multi-core processor behaves as if it were multiple processors. Each of the multiple processor cores may essentially operate independently, while sharing certain common resources, such as a cache. Multi-core processors therefore provide additional opportunities for increased processing efficiency.

As the size, power, and complexity of partitionable computer hardware continues to increase, it is becoming increasingly desirable to provide flexibility in the allocation of computer resources (such as processors and I/O devices) among partitions. Insufficient flexibility in resource allocation may, for example, lead to underutilization of resources allocated to a first partition, while a second partition lacking sufficient resources operates at maximum utilization. What is needed, therefore, are improved techniques for allocating computer resources to partitions in partitionable computer systems.

BRIEF DESCRIPTION OF THE DRAWINGS

FIG. 12A is a diagram of a partition-identifying address according to one embodiment of the present invention; and FIG. 12B is a diagram of a partition-identifying address according to another embodiment of the present invention.

DETAILED DESCRIPTION

Figure 1:
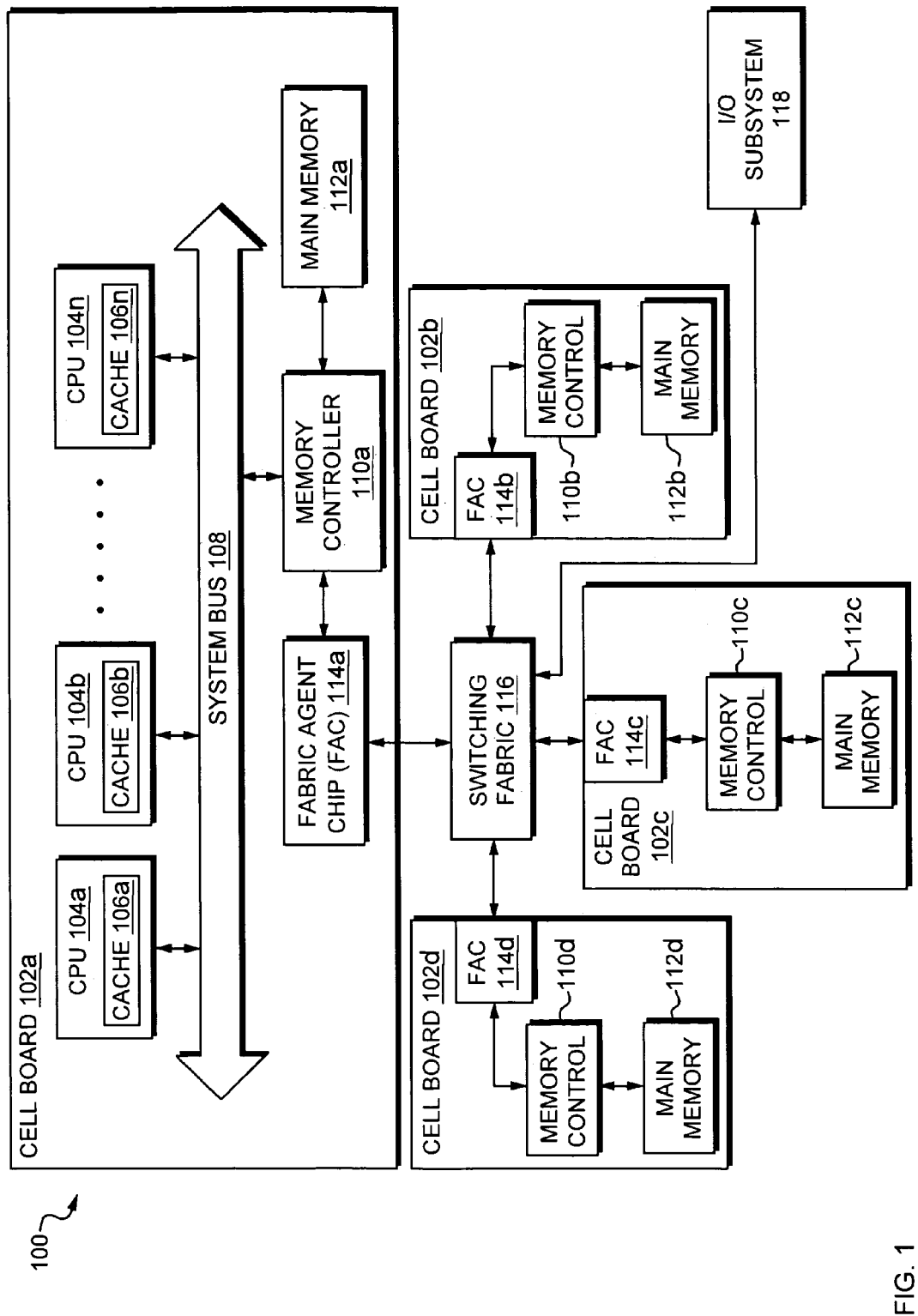
FIG. 1 is a block diagram of a multiprocessor computer system according to one embodiment of the present invention.

Before describing embodiments of the present invention, general features of multiprocessor computer architectures will be described. Although there are a variety of multiprocessor computer architectures, the symmetric multiprocessing (SMP) architecture is one of the most widely used architectures. Referring to FIG. 1, a computer system 100 having an SMP architecture is shown in block diagram form. The computer system 100 includes a plurality of cell boards 102a-d interconnected using a switching fabric 116, also referred to as a "system fabric" or simply a "fabric." Each of the cell boards 102a-d includes a plurality of CPUs, a system bus, and main memory.

For ease of illustration and explanation, the cell board 102a is shown in more detail in FIG. 1 and will now be described in more detail. The other cell boards 102b-d, however, may include components and a structure that are the same as or similar to that of cell board 102a. The cell board 102a includes a plurality of CPUs 104a-n, where n is a number such as 2, 4, 8, or 16. The CPUs 104a-n include on-board caches 106a-n, respectively. The cell board 102a also includes a system bus 108, main memory 112a, and memory controller 110a. The CPUs 102a-n are coupled directly to the system bus 108, while main memory 112a is coupled to the system bus 108 through memory controller 110a. CPUs 104a-n may communicate with each other over the system bus 108 and may access the memory 112a over the system bus 108 through the memory controller 110a, as is well-known to those of ordinary skill in the art.

Although cell boards 102a-d include their own local system memories 112a-d coupled to corresponding memory controllers 110a-d, the memories 112a-d may be addressed by the CPUs in the cell boards 102a-d using a single combined physical address space. The fabric 116 provides a mechanism for communication among the cell boards 102a-d to perform such shared memory access and other inter-cell board communication.

The fabric 116 may, for example, include one or more crossbar switches. A crossbar switch is a device that has a number of input/output ports to which devices may be connected. A pair of devices connected to a pair of input/output ports of a crossbar switch may communicate with each other over a path formed within the switch connecting the pair of input/output ports. The paths set up between devices can be fixed for some duration or changed when desired. Multiple paths may be active simultaneously within the crossbar switch, thereby allowing multiple pairs of devices to communicate with each other through the crossbar switch simultaneously and without interfering with each other.

The fabric 116 may be implemented using components other than crossbar switches. For example, the fabric 116 may be implemented using one or more buses.

Cell board 102a also includes a fabric agent chip 114a that is coupled to the fabric 116 and which acts as an interface between the cell board 102a and the other cell boards 102b-d in the system 100. The other cell boards 102b-d similarly include their own fabric agent chips 114b-d, respectively. Although the fabric agent chips 114a-d are illustrated as distinct components in FIG. 1, fabric agent chips 114a-d may be considered to be part of the system fabric 116.

As described above, the local memories 112a-d in the cell boards 102a-d may be accessed using a single physical address space. In an SMP such as the system 100 shown in FIG. 1, this is made possible by the fabric agent chips 114a-d. For example, consider a case in which CPU 104a issues a memory access request to memory controller 110a that addresses a memory location (or range of memory locations) in the shared physical address space. If the memory controller 110a cannot satisfy the memory access request from the local memory 112a, the memory controller 110a forwards the request to the fabric agent chip 114a. The fabric agent chip 114a translates the physical address in the request into a new memory address (referred to as a "fabric address") that specifies the location of the requested memory, and transmits a new memory access request using the new fabric address to the fabric 116. The fabric 116 forwards the memory access request to the fabric agent chip in the appropriate cell board.

The requested memory access is performed using the local memory of the receiving cell board, if possible, and the results are transmitted back over the fabric 116 to the fabric agent chip 114a and back through the memory controller 110a to the CPU 104a. The CPUs in cell boards 102a-d may thereby access the main memory in any of the other cell boards 102a-d over the fabric 116 using the fabric agent chips 114a-d in the cell boards 102a-d. One goal of such a system is to make the implementation of memory access transparent to the CPUs 104a-d, in the sense that the CPUs 104a-d may transmit and receive responses to memory access requests in the same way regardless of whether such requests are satisfied from onboard memory or offboard memory.

In one embodiment of the present invention, techniques are provided for allocating multiple physical resources on a single chip to a plurality of partitions in a partitionable computer system. In this embodiment, when one of the resources generates a transaction containing a physical address, a partition identification value (identifying the partition to which the resource is allocated) is stored in the physical address to create a partition-identifying address. The transaction, including the partition-identifying address, is transmitted over the fabric 116 and thereby routed to the appropriate destination.

This embodiment will be explain using an example in which multiple microprocessor cores in a single microprocessor are allocated to a plurality of partitions. For example, referring to FIG. 2, a functional block diagram is shown of the CPU 104a according to one embodiment of the present invention. In the embodiment illustrated in FIG. 2, the CPU 104a is a multi-core processor. In particular, the CPU 104a includes a plurality of processor cores 204a-n on a single chip, where n may be any number, such as 2, 4, 8, or 16. The cores 204a-n may, for example, be conventional processor cores such as those found in conventional multi-core processors. In the embodiment illustrated in FIG. 1, all of the cores 204a-n share a single cache 208. The cores 204a-n need not, however, share a single cache. Rather, for example, each core may have its own cache, or groups of cores may share different caches.

In a conventional partitionable computer system, all of the cores in a multi-core processor are required to be allocated to a single partition. Furthermore, if the CPU 104a were a conventional multi-core processor, the cores 204a-n would communicate directly with the cache 208. For example, the core 204a would transmit a memory write request, including the address of the memory address to be written, directly to the cache 208, which would satisfy the request locally if possible or by performing an off-board write to main memory otherwise.

Figure 2:
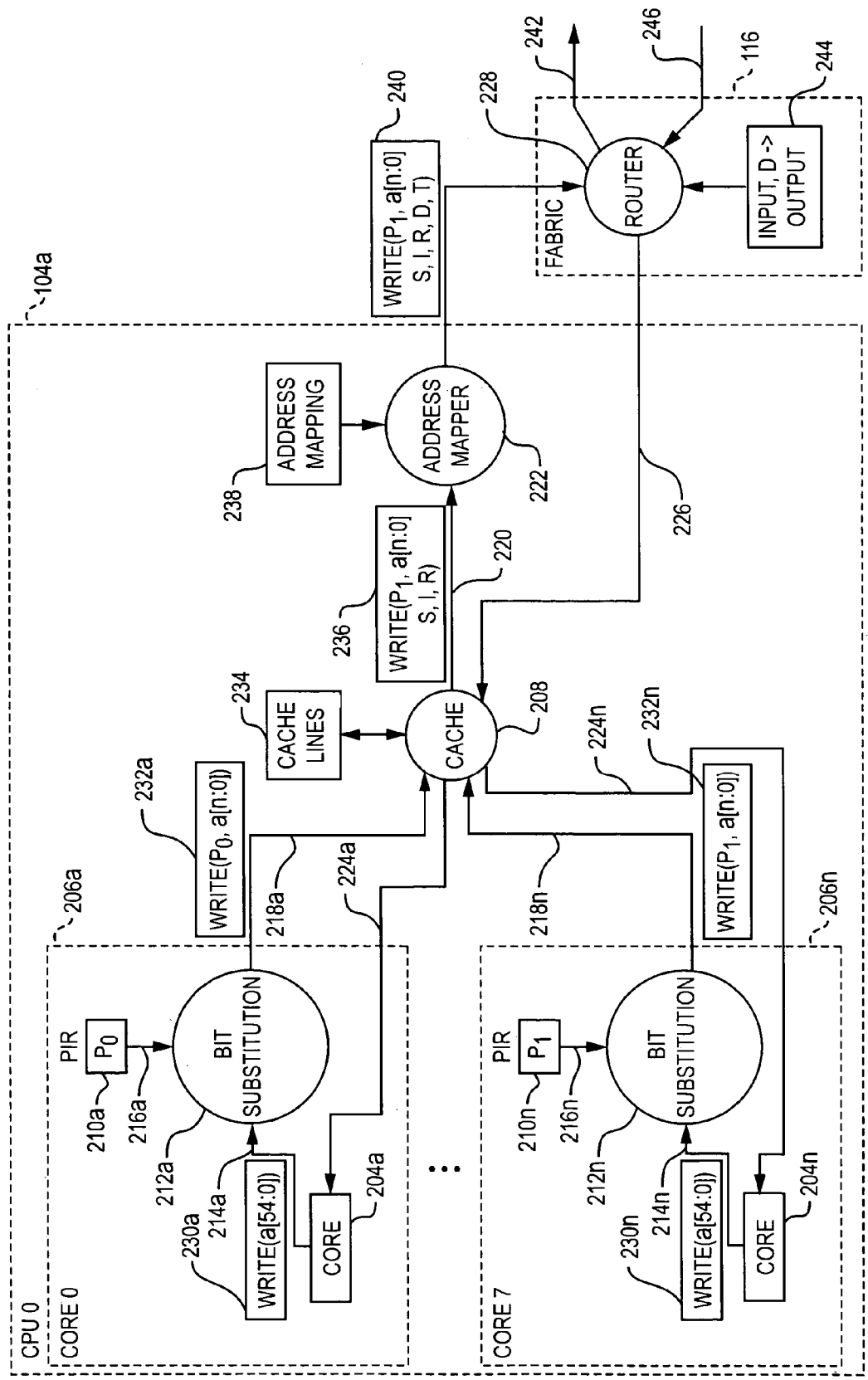
FIG. 2 is a block diagram of one of the CPUs of the computer system of FIG. 1 according to one embodiment of the present invention.
Figure 5:
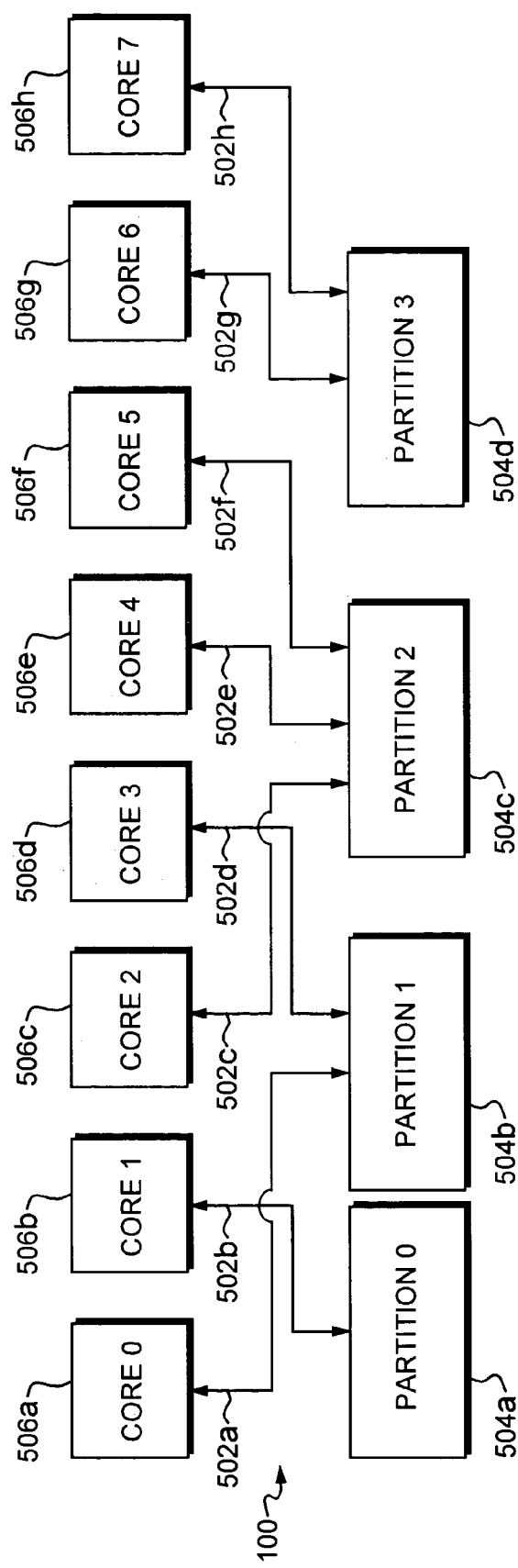
FIG. 5 is a diagram of a mapping between processor cores and hardware partitions in a partitionable computer system according to one embodiment of the present invention.

The multi-core processor 104a illustrated in FIG. 2, in contrast, enables the cores 204a-n to be allocated to a plurality of partitions. For example, referring to FIG. 5, a diagram is shown of a mapping 502 between processor cores 506a-h and partitions 504a-d in the partitionable computer system 100 according to one embodiment of the present invention. Cores 506a-h in FIG. 5 represent cores 204a-n in FIG. 2 in the case where n=8. For example, core 506a represents core 204a and core 506h represents core 204n when n=8.

Note that each of the partitions 504a-d is not itself a physical component of the computer system 100. Rather, each of the partitions 504a-d is a logical construct that is defined by the resources (e.g., processor cores) that are allocated to it. The resources allocated to a particular partition may change over time.

In the example shown in FIG. 5, core 506b is allocated to partition 504a (indicated by mapping 502b), cores 506a and 506b are allocated to partition 504b (indicated by mappings 502a and 502b, respectively), cores 506c, 506e, and 506f are allocated to partition 504 (indicated by mappings 502c, 502e, and 502*f*, respectively), and cores 506*g-h* are allocated to partition 504*d* (indicated by mappings 502*g-h*, respectively).

The particular mapping 502 illustrated in FIG. 5 is shown merely for purposes of example and does not constitute a limitation of the present invention. There may be any number of partitions, and cores may be allocated to partitions in any arrangement.

To enable the cores 204*a-n* to be allocated to multiple partitions, the CPU 104*a* includes a plurality of partition ID registers 210*a-n* associated with the plurality of cores 204*a-n* respectively. For example, partition ID register 210*a* is associated with core 206*a* and stores a value that represents mapping 502*a* (FIG. 5). Similarly, partition ID register 210*n* is associated with core 204*n* and stores a value that represents mapping 502*h*. Each of the partition ID registers 210*a-n* includes at least enough bits to represent the number of partitions in the computer system 100. In particular, if P is the number of partitions in the computer system 100, each of the partition ID registers 210*a-n* includes at least $\log_2 P$ bits. For example, if there are four partitions (as in the example illustrated in FIG. 5), each of the partition ID registers 210*a-n* includes at least 2 ($\log_2 4$) bits.

Each of the partition ID registers 210*a-n* stores a unique partition ID value that uniquely identifies the partition to which the corresponding one of the cores 204*a-n* is allocated. For example, let $PIR_i$ be the partition ID register at index i, and let $C_i$ be the corresponding processor core at index i, where i ranges from 0 to n−1. If core $C_i$ is allocated to partition j, then the value j may be stored in the partition ID value in partition ID register $PIR_i$. In this way, a unique value identifies each of the partitions in the system 100. The values stored in the partition ID registers 210*a-n* may, for example, be set by configuration software executing in the computer system 100.

For example, referring again to the example illustrated in FIG. 5, the value 1 (binary 01) may be stored in partition ID register 210*a*, thereby indicating that core 204*a* (represented by core 506*a* in FIG. 5) is allocated to partition 1 (504*b*). Similarly, the value 3 (binary 11) may be stored in partition ID register 210*n*, thereby indicating that core 204*n* (represented by core 506*h* in FIG. 5) is allocated to partition 3 (504*d*).

The CPU 104*a* may be configured so that the partition ID values stored in the partition ID registers 210*a-n* cannot be changed by the operating system executing on the computer system 100. This fixedness of the partition ID values may be enforced, for example, by any of a variety of hardware security mechanisms, or simply by agreement between the configuration software and the operating system.

To implement the allocation of the cores 204*a-n* to the multiple partitions 504*a-d*, the main memory 112*a-d* of the computer system 100 is allocated among the partitions 504*a-d*, so that each partition is allocated a portion of the main memory 112*a-d*. The main memory 112*a-d* may be allocated to the partitions 504*a-d* in blocks of any size. For example, the main memory 112*a-d* may be allocated to partitions 504*a-d* on a per-address, per-page, or per-controller basis.

In one embodiment of the present invention, a core that transmits a memory access request need not specify the partition to which the requested memory addresses are allocated. Rather, the core need only specify the requested memory address using a memory address (referred to as a "physical address") within an address space (referred to as a "physical address space") associated with the partition to which the core is allocated. Typically the main memory 112*a-d* is logically divided into a plurality of physical address spaces. Each of the physical address spaces typically is zero-based, which means that the addresses in each physical address space typically is numbered beginning with address zero.

To accomplish this result, mechanisms are provided for distinguishing a particular address in one partition from the same address in other partitions. In particular, the CPU 104*a* includes bit substitution circuits 212*a-n*, which are coupled between cores 204*a-n* and partition ID registers 210*a-n*, respectively.

To appreciate the function performed by the bit substitution circuits 212*a-n*, consider a case in which core 204*a* transmits a write command 230*a* on lines 214*a* to bit substitution circuit 212*a*. The write command 230*a* includes a physical address of the memory location to be written and a value to write into that location. The physical address is illustrated in FIG. 2 as "a[54:0]" to indicate that bits 0-54 of the address contain useful (address-identifying) information.

The term "system space" refers herein to an address space that contains unique addresses for each memory location in the entire main memory 112*a-d*. Assume, for purposes of example, that the system address space is 4 GB (0x100000000) and that there are four equally-sized (1 GB) partitions. The physical memory space of each of the partitions in such a case would have an address range of 0-1 GB (0x00000000-0x40000000). The first partition might be allocated (mapped) to the first gigabyte of the system address space, the second partition might be allocated to the second gigabyte of the system address space, and so on. When a core allocated to a particular partition generates a physical memory address as part of a memory access request, it is necessary to translate the physical memory address into a system memory address. Examples of techniques for performing this translation according to one embodiment of the present invention will now be described.

For purposes of example, assume that the physical address in the write command 230*a* transmitted on lines 214*a* is a 64-bit value but that only the 55 least significant bits are needed to fully address the physical address space allocated to a single partition. In such a case, the 9 uppermost address bits are not needed to specify physical addresses. Upon startup of a multi-partition computer system, the operating system executing in each partition is informed of the size of the physical address space that is allocated to it. As a result, a well-behaved operating system will not generate addresses that use more bits than necessary (e.g., 55) to address its allocated memory partition. As described in more detail below, however, even if the operating system in a particular partition is not well-behaved and generates addresses outside of its allocated address range, the techniques disclosed herein prevent such an operating system from accessing such prohibited addresses, thereby enforcing inter-partition security.

Figure 3:
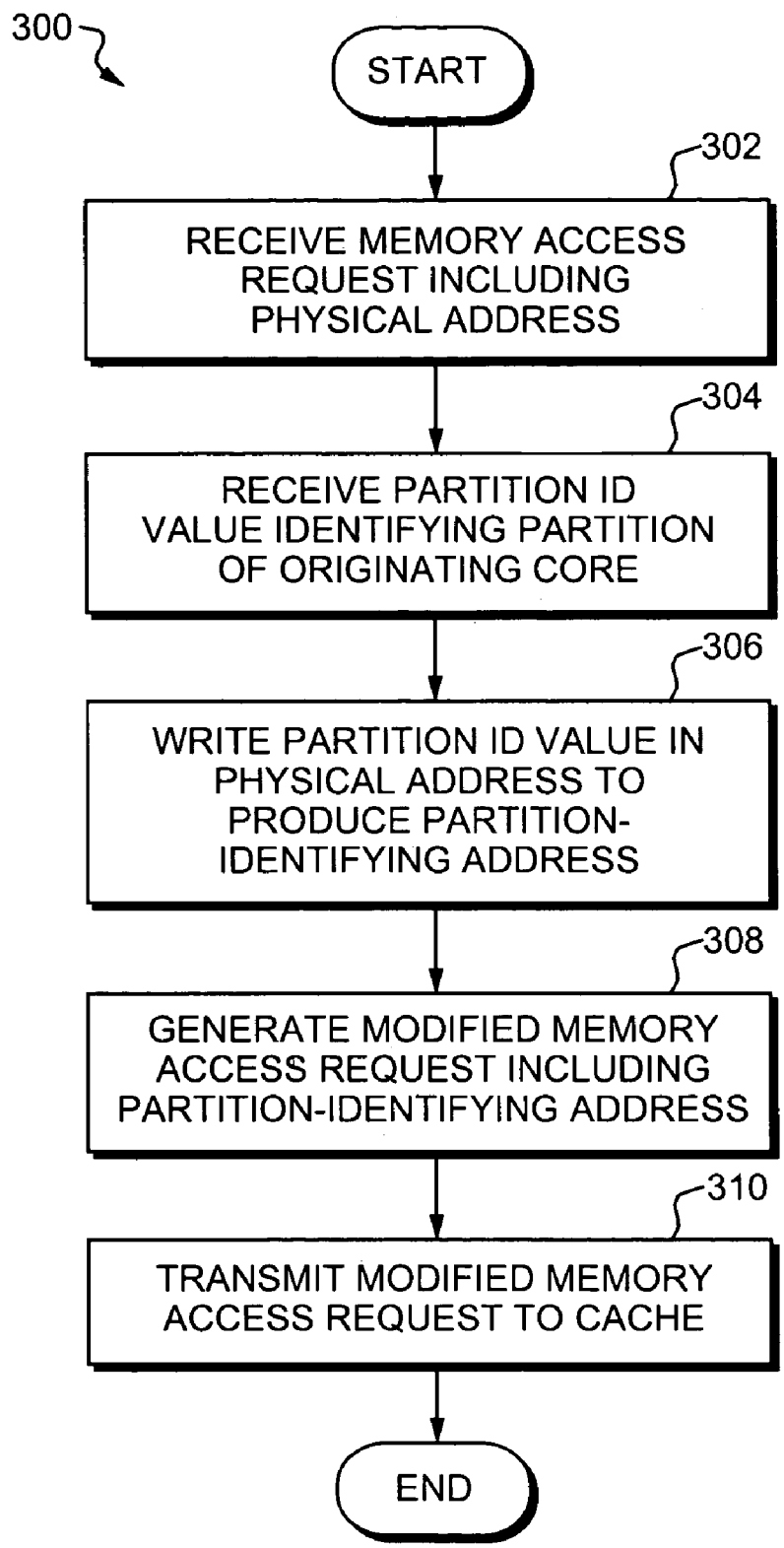
FIG. 3 is a flowchart of a method that is performed by a bit substitution circuit of FIG. 2 according to one embodiment of the present invention.

Referring to FIG. 3, a flowchart is shown of a method 300 that is performed by the bit substitution circuit 212*a* according to one embodiment of the present invention when write command 230*a* is transmitted by core 204*a* on lines 214*a*. The bit substitution circuit 212*a* receives the write command 230*a* (or other memory access request, such as a read command) (step 302). In response to receiving write command 230*a*, the bit substitution circuit 212*a* reads the partition ID value from the partition ID register 210*a* on lines 216*a* (step 304). The bit substitution circuit 212*a* writes the partition ID value into the physical address, thereby producing a partition-identifying address that includes both the original physical address and the partition ID value (step 306).

Referring to FIG. 12A, a diagram is shown of an example of a partition-identifying address 1200 produced in step 306 according to one embodiment of the present invention. The example partition-identifying address 1200 illustrated in FIG. 12A is 64 bits wide. Portion 1202 (bits 0-52) of partition-identifying address 1200 contains bits 0-52 of the physical address contained in the original write command 230a. In one embodiment of the present invention, bit substitution circuit 212a writes the partition ID value obtained from write command 230a into portion 1204 (bits 53-54) of the partition-identifying address 1200 (step 306), thereby overwriting the original values stored in portion 1204. Portion 1208, which includes both portions 1202 and 1204, therefore unambiguously identifies the system memory address indicated by the original write command 230a. Portion 1206 (bits 55-63) of the partition-identifying address 1200 are unused. Portion 1208 therefore represents the "used portion" of address 1200 because the combination of the partition ID portion 1204 and the physical address portion 1202 are used to specify a unique address in the system 100.

Recall that a well-behaved operating system will not attempt to access memory locations having addresses outside of the address space that has been allocated to it, and will therefore not set any of the bits in portions 1204 or 1206. If, however, an operating system does set any bits in portion 1204, such bits will be overwritten by the bit substitution circuit 212a in step 306. The bit substitution circuit 212a may further be configured to overwrite portion 1206 with zeros or some other value. The bit substitution circuit 212a may thereby prevent the operating system from accessing addresses outside of its partition and thereby enforce inter-partition security.

The particular layout of the partition-identifying address 1200 in FIG. 12A is shown merely for purposes of example and does not constitute a limitation of the present invention. Rather, partition-identifying addresses of any size and having any layout may be used in conjunction with embodiments of the present invention. For example, the layout of partition-identifying addresses may vary from partition to partition. For example, one partition may be allocated twice as much address space as another, in which case addresses in the larger partition will include one less bit of partition ID (portion 1204) and one more bit of physical address (portion 1202) than addresses in the smaller partition. The bit substitution circuits 212a-n, therefore, may be individually programmable to insert partition IDs of varying sizes into the addresses generated by the cores 204a-n.

The bit substitution circuit 212a generates a first modified write command 232a (or other memory access request) containing the partition-identifying address generated in step 306 (step 308). The bit substitution circuit 212a transmits the first modified write command 232a (or other memory access request) to the cache 208 on lines 218a (step 310).

The combination of a core, partition ID register, and bit substitution circuit in the manner described and illustrated above with respect to FIG. 2 is referred to herein as an "extended core." For example, CPU 104a includes extended cores 206a-n. Extended core 206a includes core 204a, partition ID register 210a, and bit substitution circuit 212a, while extended core 206n includes core 204n, partition ID register 210n, and bit substitution circuit 212n. Although core 204a, bit substitution circuit 212a, and partition ID register 210a are illustrated as distinct components in FIG. 2, the functions performed by the bit substitution circuit 212a and/or partition ID register 206a may be integrated into the core 204a, so that the core 204a may communicate directly with the cache 208.

Figure 4A:
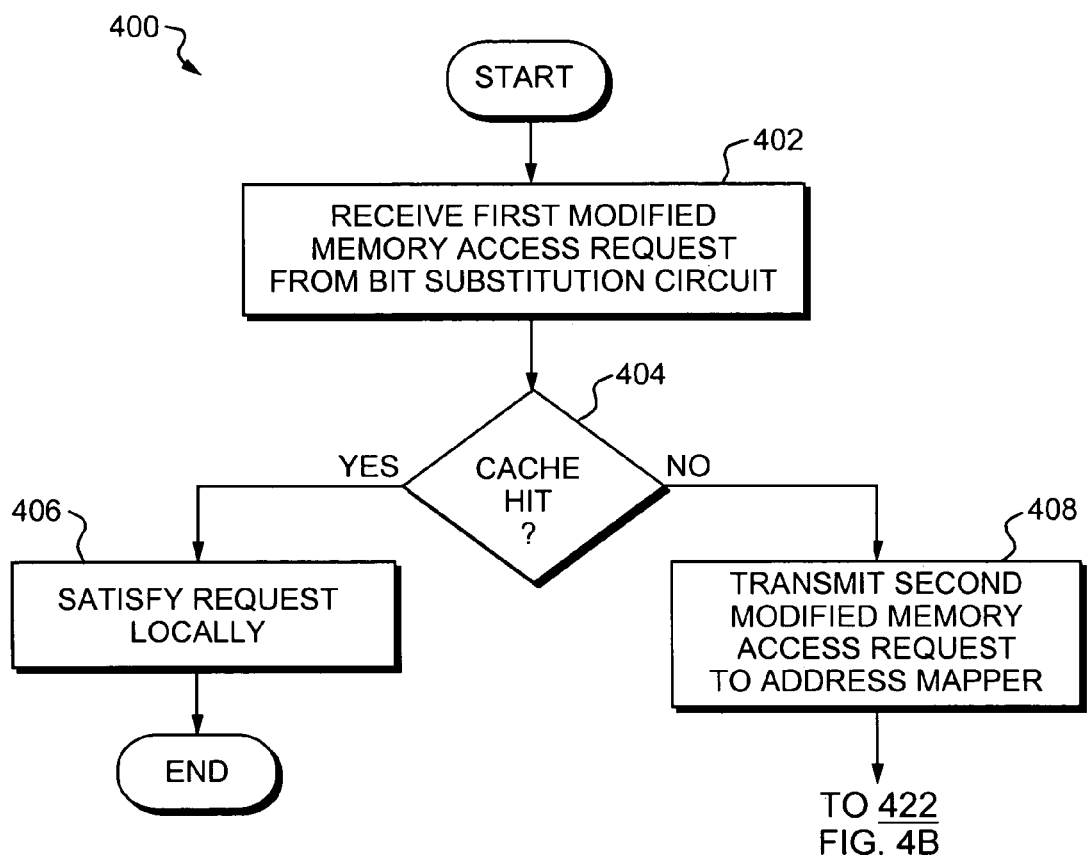
FIG. 4A is a flowchart of a method that is performed by the cache of FIG. 2 according to one embodiment of the present invention.

Referring to FIG. 4A, a flowchart is shown of a method 400 that is performed by the cache 208 in response to receipt of the first modified write command 232a according to one embodiment of the present invention. The cache 208 receives the first modified write command 232a from the bit substitution circuit 212a (step 402). The cache 208 determines whether the write request can be satisfied locally, i.e., whether there is a cache hit in cache lines 234 based on the partition-identifying address contained in the first modified write command 232a (step 404). In other words, the cache 208 determines whether the value of the memory location addressed by the partition-identifying address contained in the first modified write command 232a is stored in cache lines 234. The cache 208 may perform step 404 by using the partition-identifying address contained in the first modified write command 232a as an index and tag and then using any of a variety of well-known techniques to determine whether there is a cache hit based on that index and tag.

Note that the address bits in which the partition ID value is stored may occupy either the index or tag field of the cache 208. If the partition ID value is stored in the index field of the cache 208, then the partitions 504a-d are allocated fixed and distinct (non-overlapping) portions of the cache 208. If, however, the partition ID value is stored in the tag field of the cache 208, then the entire cache 208 is shared by the partitions 504a-d, and the particular cache locations used by any partition is dynamic and depends on the workload of the cores 204a-n at any particular point in time.

If there is a cache hit, the cache 208 performs the write locally (i.e., within the cache lines 234) (step 406) and the method 400 terminates. The cache 208 may transmit an acknowledgment to the core 204a on lines 224a. If the core 204a transmits a read command to the cache 208, the cache 208 may transmit the read values to the core 204a on lines 224a.

If there is a cache miss, the cache 208 transmits a second modified write command 236 to an address mapper 222 (step 408). In one embodiment of the present invention, the second modified write command 236 contains: (1) a source terminus ID (e.g., the terminus ID of the memory controller 110a that services the CPU 104a), labeled "S" in FIG. 2; (2) a transaction ID (a unique transaction identifier), labeled "T" in FIG. 2; (3) a request type (e.g., memory read or write), labeled "R" in FIG. 2; and (4) the partition-identifying address 1200 extracted from the first modified write command 232a, labeled "$p_1$, a[n:0]" in FIG. 2.

Although particular transactions are described above with respect to core 206a for purposes of example, the other cores 206b-n may perform transactions in the same manner. For example, core 204n may generate a write command 230n on lines 214n, in response to which bit substitution circuit 212n may read the value of partition ID register 210n on lines 216n. The bit substitution circuit 212n may transmit a first modified write command 232n on lines 218n, which may be processed by the cache 208 in the manner described above. The cache 208 may communicate with the core 204n directly over lines 224n.

Figure 4B:
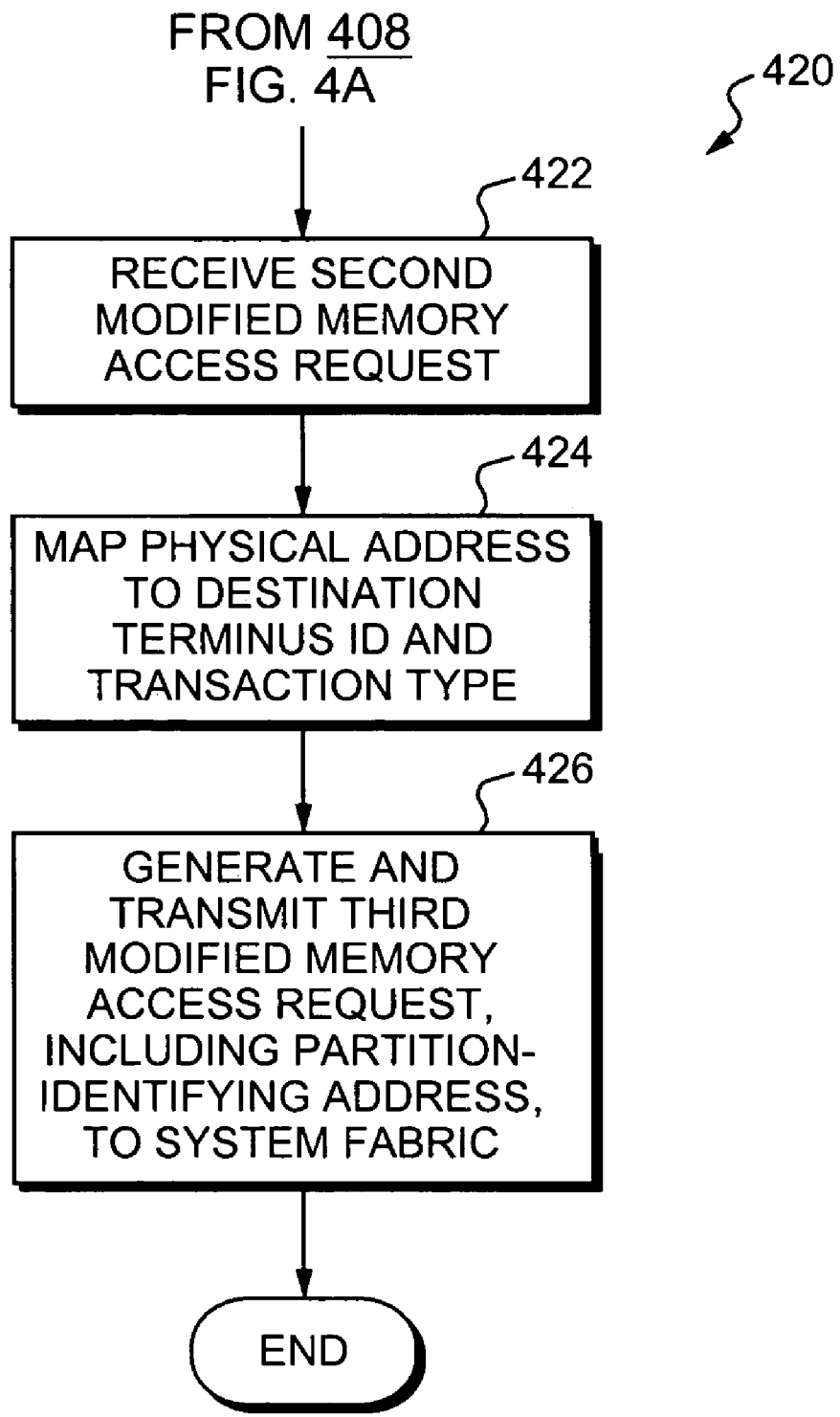
FIG. 4B is a flowchart of a method that is performed by the address mapper of FIG. 2 according to one embodiment of the present invention.

In one embodiment of the present invention the partition-identifying address contained in the second modified write command 236 is translated into a system address. Referring to FIG. 4B, a flowchart is shown of a method 420 that is performed in one embodiment of the invention to perform such a translation. The method 420 may, for example, be performed after step 408 of method 400 (FIG. 4A).

The CPU 104a includes an address mapper 222, which is coupled to the cache 208 over lines 220 and which therefore receives the second modified write command 236 (step 422). The address mapper 222 maps the partition-identifying address 1200 contained in the second modified write command 230 to: (1) a destination terminus ID (e.g., a terminus ID of the memory controller that controls access to the requested memory addresses), and (2) a transaction type (step 424). The transaction type serves a purpose similar to that of the original request type (e.g., memory read or write), except that the request type is used for transactions over the fabric 116. Techniques for translating request types into transaction types are well-known to those of ordinary skill in the art.

In one embodiment of the present invention, each of the CPUs in the system 100 (e.g., CPUs 104a-n) and each of the memory controllers 110a-d in the system 100 has a unique terminus identifier (terminus ID). In such an embodiment, a particular physical address in a particular partition may be uniquely addressed by a combination of the physical address, the partition ID of the partition, and the terminus ID of the memory controller that controls the memory in which that physical address is stored. Note further that because the address transmitted over the fabric 116 is a partition-identifying address (i.e., an address which includes both a physical address and a partition ID), the target memory controller may distinguish among the same physical address in different partitions. In the embodiment illustrated in FIG. 2, therefore, a single memory controller may control memory allocated to any number of partitions.

It should be appreciated, however, that this particular scheme is merely an example and does not constitute a limitation of the present invention. Other addressing schemes may be used in conjunction with the techniques disclosed herein, in which case different combinations of terminus identifiers, physical addresses, system addresses, partition identifiers, or other data may be required to uniquely address particular memory locations.

The address mapper 222 may, for example, maintain an address mapping 238 that maps partition-identifying addresses to destination terminus IDs and transaction types. The address mapper 222 may use the mapping 238 (which may, for example, be implemented as a lookup table) to perform the translation in step 424. The address mapping 238 need not contain an entry for every partition-identifying address. Rather, the address mapping 238 may, for example, map ranges of partition-identifying addresses (identified by their most significant bits) to pages of memory or to memory controllers. The address mapper 222 may ensure that a processor core allocated to one partition cannot access memory locations in another partition by mapping such requests to a null entry, thereby causing the address mapper 222 to generate a mapping fault.

The address mapper 222 generates and transmits a third modified write command 240 to the system fabric 116 (step 426). The third modified write command 240 includes: (1) the source terminus ID (S), transaction ID (I), request type (R), and partition-identifying address ($p_1$, a[n:0]) from the second modified write command 236; and (2) the destination terminus ID (D) and transaction type (T) identified in step 424. The system fabric 116 includes a router 228 that uses techniques that are well-known to those of ordinary skill in the art to transmit the third modified write command 240 to the memory controller having the specified destination terminus ID. The router 228 may, for example, maintain a mapping 244 that maps pairs of input ports and destination terminus IDs to output ports.

When the router 228 receives the third modified write command 240 on a particular input port, the router uses the identity of the input port and the destination terminus ID contained in the third modified write command 240 to identify the output port that is coupled to the memory controller that controls access to the requested memory address(es). The router 228 transmits the third modified write command 240 (or a variation thereof) to the identified memory controller on lines 242. The third modified write command 240 may then be satisfied by the destination memory controller using techniques that are well-known to those of ordinary skill in the art.

When the router 228 receives an inbound transaction on lines 246, the router 228 may route the transaction to the cache on lines 226 using techniques that are well-known to those of ordinary skill in the art. The incoming transaction may then be processed by the cache 208 and, if necessary, by one or more of the cores 206a-n, using conventional techniques.

In another embodiment of the present invention, techniques are provided for allocating a plurality of hardware resources to a plurality of partitions in a partitionable computer system. This embodiment will be explained using an example in which a plurality of resources in a single. I/O controller are allocated to a plurality of partitions. For example, referring to FIGS. 6A-6B, a functional block diagram is shown of an I/O controller 602 according to one embodiment of the present invention. The I/O controller 602 serves two I/O devices 604a-b coupled to the I/O controller 602 through I/O ports 630a-b, respectively. Examples of techniques will now be described for allocating the first I/O port 628a to a first partition and the second I/O port 628b to a second partition, and thereby for allocating the first I/O device 604a to the first partition and the second I/O device 604b to the second partition.

Figure 7:
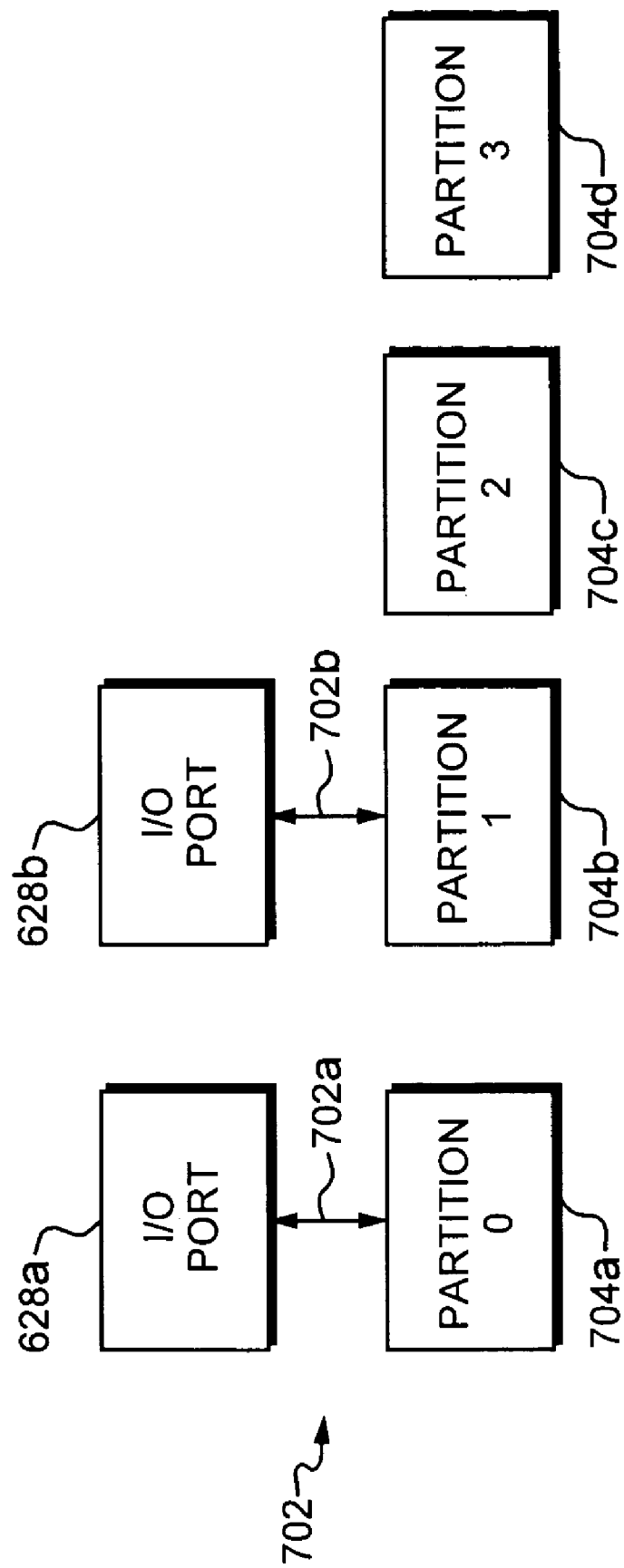
FIG. 7 is a diagram of a mapping between I/O ports and partitions in a partitionable computer system according to one embodiment of the present invention.

For example, referring to FIG. 7, a diagram is shown of a mapping 702 between I/O ports 628a-b and hardware partitions 704a-d in the partitionable computer system 100 according to one embodiment of the present invention. The mapping 702 includes mappings 702a-b between I/O ports 628a-b and partitions 704a-b, respectively. Note that there are two partitions 704c-d to which neither of the I/O ports 628a-b is mapped. Other I/O ports in other I/O controllers (not shown), however, may be mapped to partitions 704c-d. Although in the particular example illustrated in FIG. 7 there are two I/O ports 628a-b allocated to two partitions 704a-b, there may be any number of I/O ports and any number of partitions mapped to each other in any arrangement.

The I/O controller 602 includes a destination decoder 608, which verifies that incoming transactions (on lines 610) are addressed to one of the I/O devices 604a-b controlled by the I/O controller 602. If an incoming transaction is not addressed to one of the I/O devices 604a-b, the destination decoder 608 does not transmit the transaction further within the I/O controller 602.

Figure 8:
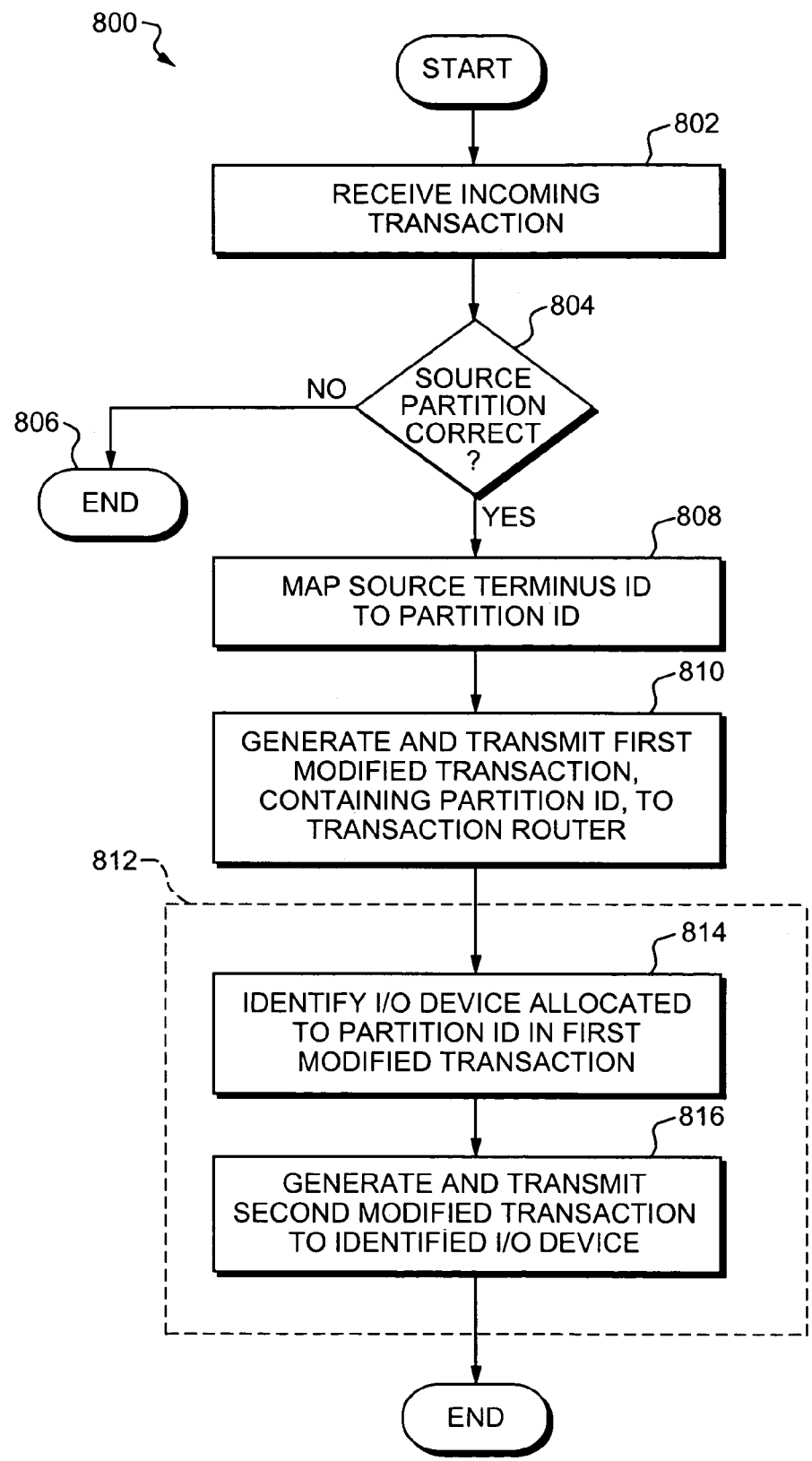
FIG. 8 is a flowchart of a method performed by the destination decoder of FIGS. 6A-6B to decode a physical address in an incoming transaction according to one embodiment of the present invention.

Referring to FIG. 8, a flowchart is shown of a method 800 that is performed by the destination decoder 608 when an incoming transaction 612 is received on lines 610 in one embodiment of the present invention. The destination decoder 608 receives the incoming transaction 612 (step 802). In one embodiment of the present invention, the transaction 612 includes (1) a source terminus identifier (e.g., the terminus ID of the device that originated the transaction 612), represented as "S" in FIG. 6A; (2) the physical address to access, represented as "a" in FIG. 6A; (3) the transaction type (e.g., read or write), represented as "T" in FIG. 6A; and (4) data associated with the transaction (e.g., data to write if the transaction 612 is a write command), represented as "d" in FIG. 6A.

The destination decoder 608 examines the source terminus ID in transaction 612 to determine whether the device that transmitted the transaction 612 is allocated to any of the partitions to which the I/O ports 628a-b are allocated (step 804). If the transaction 612 was not transmitted by such a device, the transaction is not authorized to access the devices 604a-b, and the destination decoder 608 does not transmit the transaction 608 to the I/O devices 604a-b (step 806).

More specifically, the destination decoder 608 may maintain a list 614 of valid source terminus IDs. The list 614 may contain the source terminus IDs of those devices in the system 100 that are allocated to any of the partitions 704a-b to which the I/O ports 628a-b are allocated. The destination decoder 608 may perform step 804 by determining whether the source terminus ID in transaction 612 is in the list 614 and by then determining that the transaction 612 is not from an appropriate partition if the source terminus ID is not in the list 614.

If the destination decoder 608 determines in step 804 that the transaction 612 is from an appropriate device, the destination decoder 608 maps the source terminus ID to the partition ID value of the one of the I/O ports 628a-b that is in the same partition as the device that transmitted the transaction 612 (step 808). The destination decoder 608 may maintain a table 616 or other mapping of source terminus identifiers to partition ID register values. The destination decoder 608 may therefore perform step 808 by using the source terminus ID in transaction 612 as an index into the table 616 and thereby identifying the corresponding partition ID register value.

The destination decoder 608 generates a first modified transaction 620 that contains: (1) the partition ID register value (p) identified in step 808; (2) the physical address (a) contained in the transaction 612; and (3) the data (d) contained in the transaction 612. The destination decoder 608 transmits the first modified transaction 620 to a transaction router 622 on lines 618 (step 810).

The transaction router 622 routes the transaction 620 to the one of the I/O ports 628a-b that is allocated to the partition identified in the first modified transaction 620 (step 812). More specifically, the transaction router 622 identifies the one of the I/O ports 628a-b that is allocated to the partition ID contained in the first modified transaction 620 (step 814). The transaction router 622 may, for example, contain a lookup table that maps partition IDs to I/O ports 628a-b, and may use that lookup table to perform step 814. The transaction router 622 may generate a second modified transaction by stripping the partition ID from the first modified transaction 620 and then transmit the second modified transaction to the device identified in step 814 (step 816).

In one embodiment of the present invention, I/O ports 628a-b may either: (1) both be allocated to partition 704a; or (2) be separately allocated to partitions 704a-b in the manner illustrated in FIG. 7. To enable the I/O controller 602 to implement either such partitioning of the I/O ports 628a-b, I/O controller 602 includes switch 632. I/O device 604a is coupled to switch 632 over lines 630a and I/O device 604b is coupled to switch 632 over lines 630b. Switch 632 is in turn coupled to I/O port 628a over lines 630c. In one embodiment of the present invention, switch 632 creates a permanent pass-through connection between I/O device 604a and I/O port 628a. As a result, I/O device 604a communicates with I/O controller 602 through I/O port 628a. Transaction router 622 may be configured to route transactions associated with partition 704a to I/O port 628a and thereby to implement the allocation of I/O device 604a to partition 704a.

If both I/O ports 628a-b are allocated to partition 704a, I/O port 628b may be disabled and the switch 632 may be set to a first setting which routes all communications to and from I/O device 604b through I/O port 628a. If I/O port 628a is allocated to partition 704a and I/O port 628b is allocated to partition 704b (as shown in FIG. 7), then I/O port 628a may be enabled and the switch 632 may be set to a second setting which routes all communications to and from I/O device 604b through I/O port 628b. Note that use of the switch 632 in the manner described above is merely one example of a way in which a transaction may be decoded and routed to a specific port, and does not constitute a limitation of the present invention.

Returning to step 812 of method 800, the transaction router 622 may maintain a mapping of partition ID values and associated I/O ports. For example, consider the case in which I/O device 604a is mapped to partition 704a and in which I/O device 604b is mapped to partition 704b (as shown in FIG. 7). In such a case, if the partition ID in the first modified transaction 620 identifies partition 704a, the transaction router 622 may generate and transmit a second modified transaction 626a to I/O port 628a on lines 624a, through which the second modified transaction 628a may be forwarded to I/O device 604a on lines 630c, through switch 632, and then on lines 630a. Similarly, if the partition ID in the first modified transaction 620 identifies partition 704b, the transaction router 622 may generate and transmit a second modified transaction 626b to I/O port 628b on lines 624b, through which the second modified transaction 626b may be forwarded to I/O device 604b on lines 630b. Note that the mapping 700 illustrated in FIG. 7, in which there is a one-to-one mapping between ports 628a-b and partitions 702a-b, is provided merely as an example and does not constitute a limitation of the present invention. Techniques disclosed herein may, for example, be used in conjunction with mappings of multiple ports to a single partition, as may be accomplished by using additional bits of the physical address as part of the partition ID.

Examples of techniques will now be described for enabling the I/O devices 604a-b to perform outgoing communications through the I/O controller 602 when the I/O devices 604a-b are allocated to different partitions. Assume once again that I/O port 628a (and therefore I/O device 604a) is mapped to partition 704a and that I/O port (and therefore I/O device 604b) is mapped to partition 704b (as shown in FIG. 7). Now consider an example in which an outgoing transaction 636a is generated by I/O device 604a on lines 634a (through I/O port 628a). Transaction 636a includes a physical address (a) and data (d).

I/O controller 602 includes a plurality of partition ID registers 606a-b associated with the I/O ports 628a-b, respectively. In particular, partition ID register 606a is associated with I/O port 628a and represents mapping 702a (FIG. 7). Similarly, partition ID register 606b is associated with I/O port 628b and represents mapping 702b. Each of the partition ID registers 606a-b includes at least enough bits to distinguish among the partitions to which I/O ports 628a-b are allocated.

Each of the partition ID registers 606a-b stores a unique partition ID value that uniquely identifies the partition to which the corresponding one of the I/O ports 628a-b is allocated. For example, referring again to the example illustrated in FIG. 7, the value 0 (binary 00) may be stored in partition ID register 606a, thereby indicating that I/O port 628a is allocated to partition 0 (704a). Similarly, the value 1 (binary 01) may be stored in partition ID register 606b, thereby indicating that I/O port 628b is allocated to partition 1 (704b). The I/O controller 602 may be configured so that the partition ID values stored in the partition ID registers 606a-b cannot be changed by the operating system executing on the computer system 100.

Figure 9:
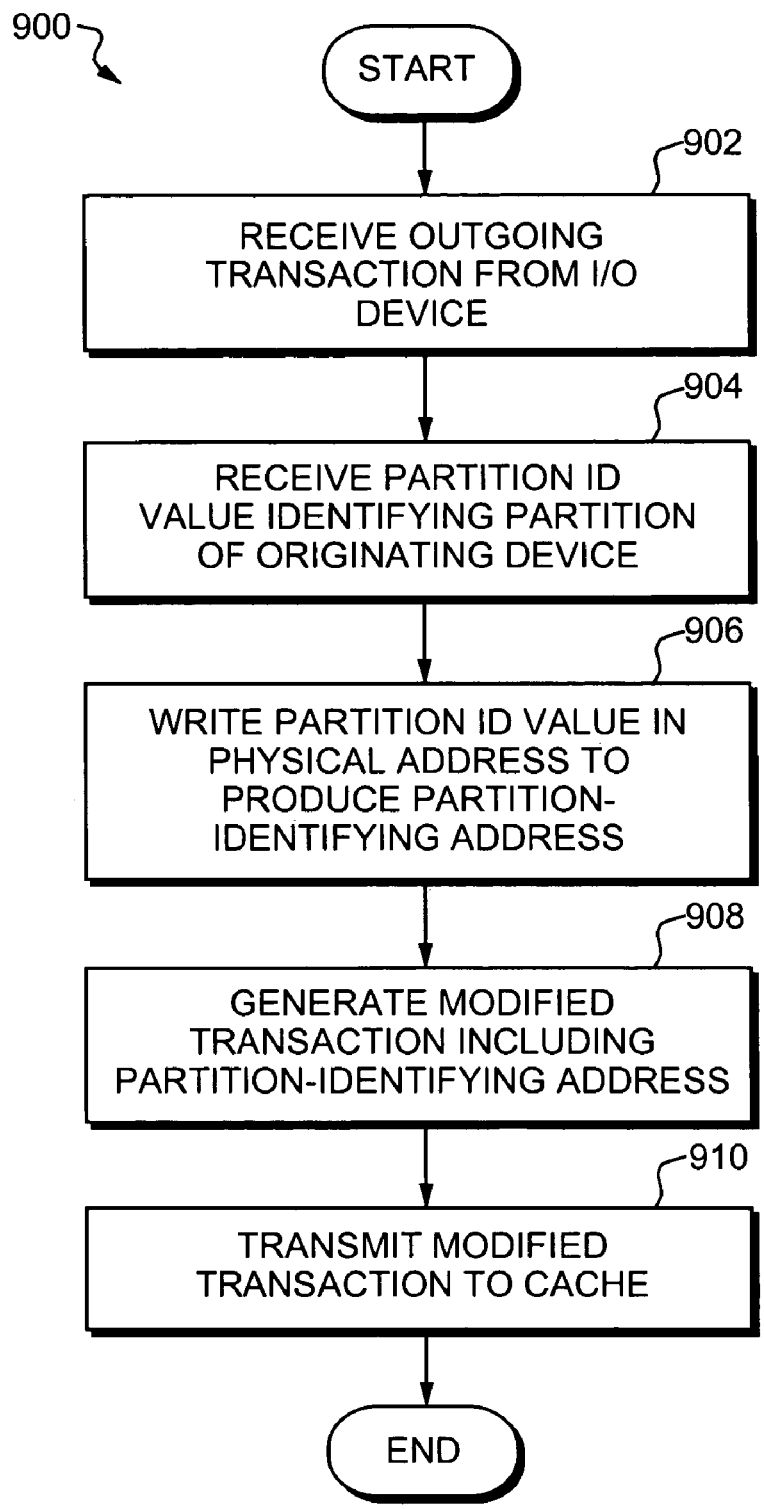
FIG. 9 is a flowchart of a method that is performed by the bit substitution circuit of FIGS. 6A-6B according to one embodiment of the present invention.

Referring to FIG. 9, a flowchart is shown of a method 900 that is performed by bit substitution circuit 638a according to one embodiment of the present invention when outgoing transaction 636a is transmitted on lines 636a by device 604a. The bit substitution circuit 638a receives the outgoing transaction 636a (step 902). In response to receiving the transaction 636a, the bit substitution circuit 638a reads the partition ID value from partition ID register 606a on lines 640a (step 904). The bit substitution circuit 638a writes the partition ID value into the physical address, thereby producing a partition-identifying address (step 906).

The partition-identifying address produced in step 906 may, for example, have the layout illustrated in FIG. 12B. The example partition-identifying address 1210 illustrated in FIG. 12B is 64 bits wide. Portion 1212 (bits 0-54) of partition-identifying address 1210 contains the physical address contained in the original transaction 636a. In one embodiment of the present invention, bit substitution circuit 638a writes the partition ID value obtained from transaction 636a into portion 1214 (bit 55) of the partition-identifying address 1210 (step 906). In other words, bit substitution circuit 638a appends the partition ID value to the original physical address. Portion 1218, which includes both portions 1212 and 1214, therefore unambiguously identifies the system memory address indicated by the original transaction 636a. Portion 1216 (bits 56-63) of the partition-identifying address 1200 are unused. Portion 1218 therefore represents the "used portion" of address 1210 because the combination of the partition ID portion 1214 and the physical address portion 1212 are used to specify a unique address in the system 100.

Note that the partition ID field 1214 of address 1210 is only one bit wide, in contrast to the partition ID field 1204 of address 1200 (FIG. 12A), which is two bits wide. The partition ID field 1214 of address 1210 need only be wide enough to distinguish among the partitions to which I/O ports 628a-b are allocated. Because I/O ports 628a-b are allocated to two ports in the example illustrated in FIGS. 6A-6B, partition ID field 1214 need only be one bit wide. Partition ID field 1204 of address 1200 (FIG. 12A), in contrast, is two bits wide because it must be capable of distinguishing among all partitions 504a-d in the system. The required minimum width of the partition ID fields 1204 and 1214 may, of course, vary depending on the number of unique partitions they are required to represent.

The particular layout of the partition-identifying address 1210 in FIG. 12B is shown merely for purposes of example and does not constitute a limitation of the present invention. Rather, partition-identifying addresses of any size and having any layout may be used in conjunction with embodiments of the present invention. The bit substitution circuit 638a generates a first modified transaction 642a containing the partition-identifying address generated in step 906 (step 908). The bit substitution circuit 638a transmits the first modified transaction 642a to cache 646 on lines 644a (step 910).

Figure 10:
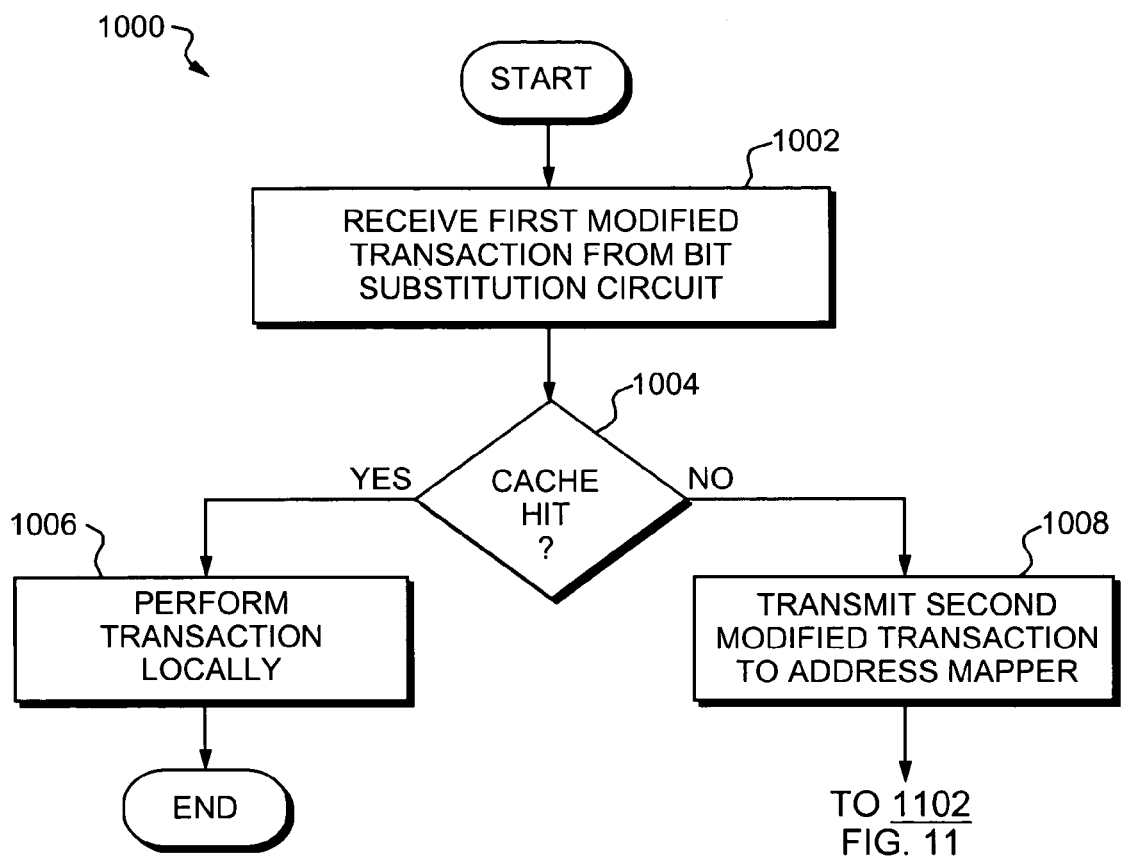
FIG. 10 is a flowchart of a method that is performed by the cache of FIGS. 6A-6B according to one embodiment of the present invention.

Referring to FIG. 10, a flowchart is shown of a method 1000 that is performed by the cache 646 in response to receipt of the first modified transaction 642a according to one embodiment of the present invention. The cache 646 receives the first modified transaction 642a from the bit substitution circuit 638a (step 1002). The cache 646 determines whether the first modified transaction 642a can be satisfied using cache data stored locally in cache lines 648 (step 1004). If there is a cache hit, the cache 646 performs the transaction locally (i.e., within the cache lines 648) (step 1006) and the method 1000 terminates. Data is written into the cache from the IO card via lines 650. If the transaction 636a is a read command, the cache 646 may transmit the read values to the device 604a on lines 650.

If there is a cache miss, the cache 646 transmits a second modified transaction 654 to an address mapper 656 on lines 654 (step 1008). In one embodiment of the present invention, the second modified transaction 652 contains the partition ID value and physical address from the first modified transaction 642a.

Figure 11:
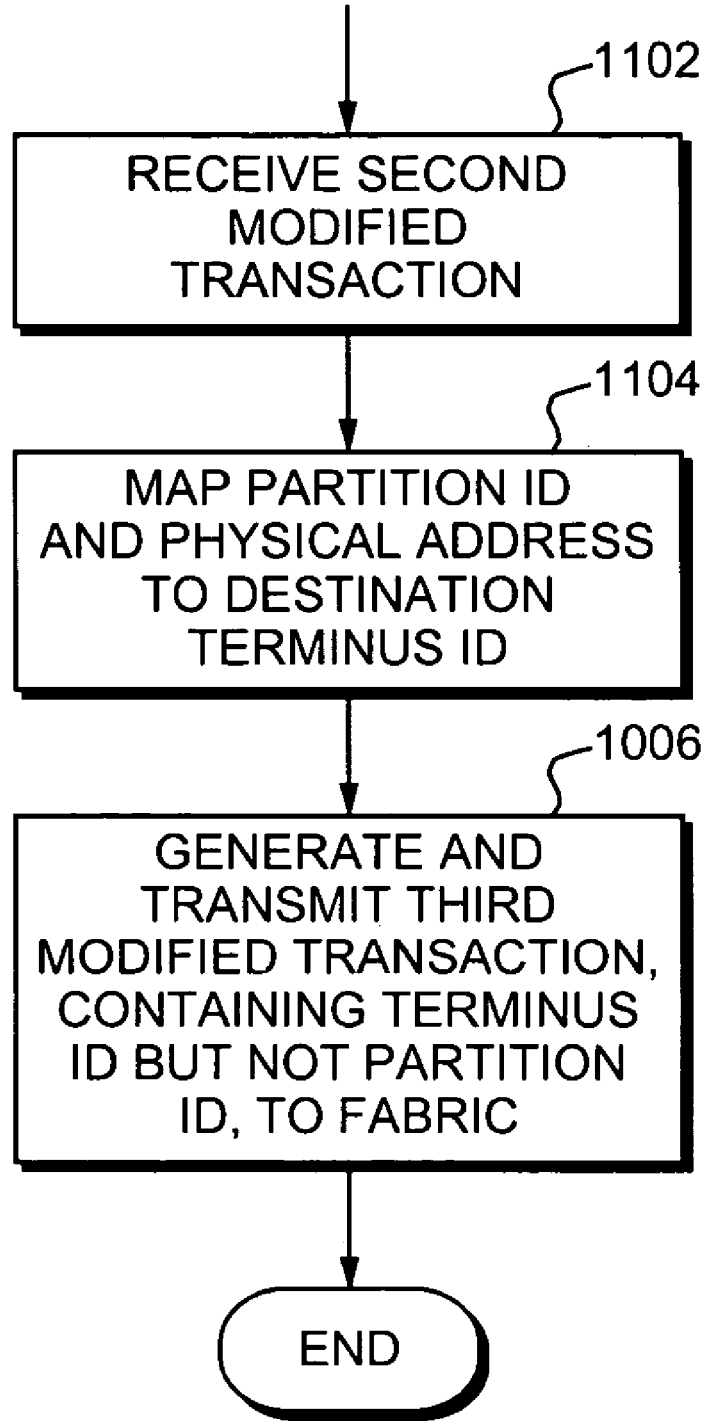
FIG. 11 is a flowchart of a method that is performed by the address mapper of FIGS. 6A-6B according to one embodiment of the present invention.

Referring to FIG. 11, a flowchart is shown of a method 1100 that is performed by the address mapper 656 when it receives the second modified transaction 652 in one embodiment of the invention. The address mapper 656 receives the second modified transaction 652 on lines 654 (step 1102). The address mapper 656 maintains a mapping 658 of address-partition ID pairs to destination terminus IDs. The address mapper 656 uses the mapping 658 to map the partition ID and address in the second modified transaction 652 into a destination terminus ID (step 1104).

The address mapper 656 generates and transmits a third modified transaction 670 to the system fabric 116 on lines 672 (step 1106). The third modified transaction 670 includes: (1) the destination terminus ID identified in step 1104; (2) the physical address from the second modified transaction 652; and (3) the data from the second modified transaction 652 (if any). Note that the third modified transaction 670 does not include the partition ID identified in step 904 (FIG. 9), because in the embodiment illustrated in FIGS. 6A-6B the partition ID is only used to distinguish internally (i.e., within the I/O controller 602) among different partitions.

As described above, router 228 routes the third modified transaction 670 to the memory controller or other device having the destination terminus ID contained in the third modified transaction 670 using the techniques described above with respect to FIG. 2.

Although the examples described above relate to partition 704a and corresponding I/O port 628a, the same or similar techniques may be used in conjunction with partition 704b and corresponding I/O port 628b. For example, bit substitution circuit 638b may receive outgoing transaction 636b from device 604b on lines 634b and substitute therein the value of partition ID register 606b, thereby generating and transmitting a first modified transaction 642b on lines 644b. The first modified transaction 642b may then be processed in the manner described above.

Among the advantages of the invention are one or more of the following.

Existing partitionable computer architectures typically allocate resources to partitions on a per-chip basis. In other words, in a conventional partitionable computer, all of the resources (such as processor cores) in a single chip must be allocated to at most one partition. As the number and power of resources in a single chip increases, such per-chip resource allocation imposes limitations on the degree of granularity with which resources may be allocated to partitions in a partitionable computer system. Such limitations limit the extent to which resources may be dynamically allocated to partitions in a manner that makes optimal use of such resources.

The techniques disclosed herein address this problem by providing the ability to allocate resources on a sub-chip basis. The ability to allocate multiple resources on a single chip to multiple partitions increases the degree to which such resources may be allocated optimally in response to changing conditions. Sub-chip partitioning allows partitionable computer systems to take full advantage of the cost and size reductions made possible by the current trend in computer chip design of providing an increasing number of functions on a single chip, while still providing the fine-grained resource allocation demanded by users.

Furthermore, embodiments of the present invention enable sub-chip partitioning to be accomplished using relatively localized modifications to existing circuitry, thereby enabling a substantial portion of existing circuitry to be used without modification in conjunction with embodiments of the present invention. For example, in the system illustrated in FIG. 2, the cores 204a-n, cache 208, and fabric 116 may be prior art components. As a result, embodiments of the present invention may be implemented relatively easily, quickly, and inexpensively.

A further advantage of techniques disclosed herein is that the bit substitution circuits 212a-n and 638a-b may enforce inter-partition security by preventing the operating system in the corresponding partition from accessing addresses in other partitions. As described above, such security may be provided by overwriting any values the operating system writes into the upper bits of addresses it generates (e.g., bits in portions 1204 or 1206 of address 1200 (FIG. 12A) and bits in portions 1214 or 1216 of address 1210 (FIG. 12B)). The techniques disclosed herein thereby provide a degree of hardware-enforced inter-partition security that cannot be circumvented by malicious or improperly-designed software.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Figure 6A:
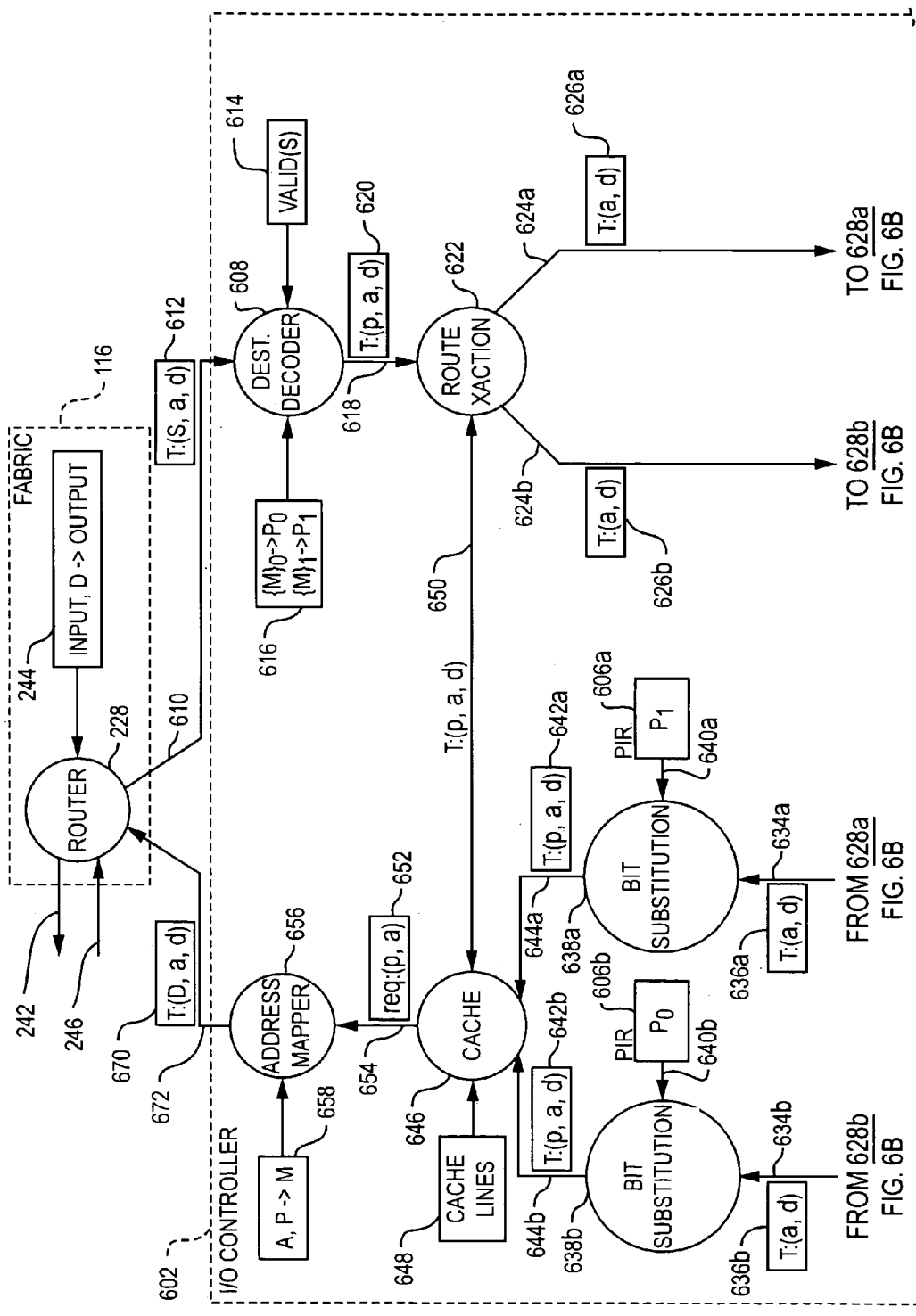
FIGS. 6A-6B illustrate an I/O controller according to one embodiment of the present invention.
Figure 6B:
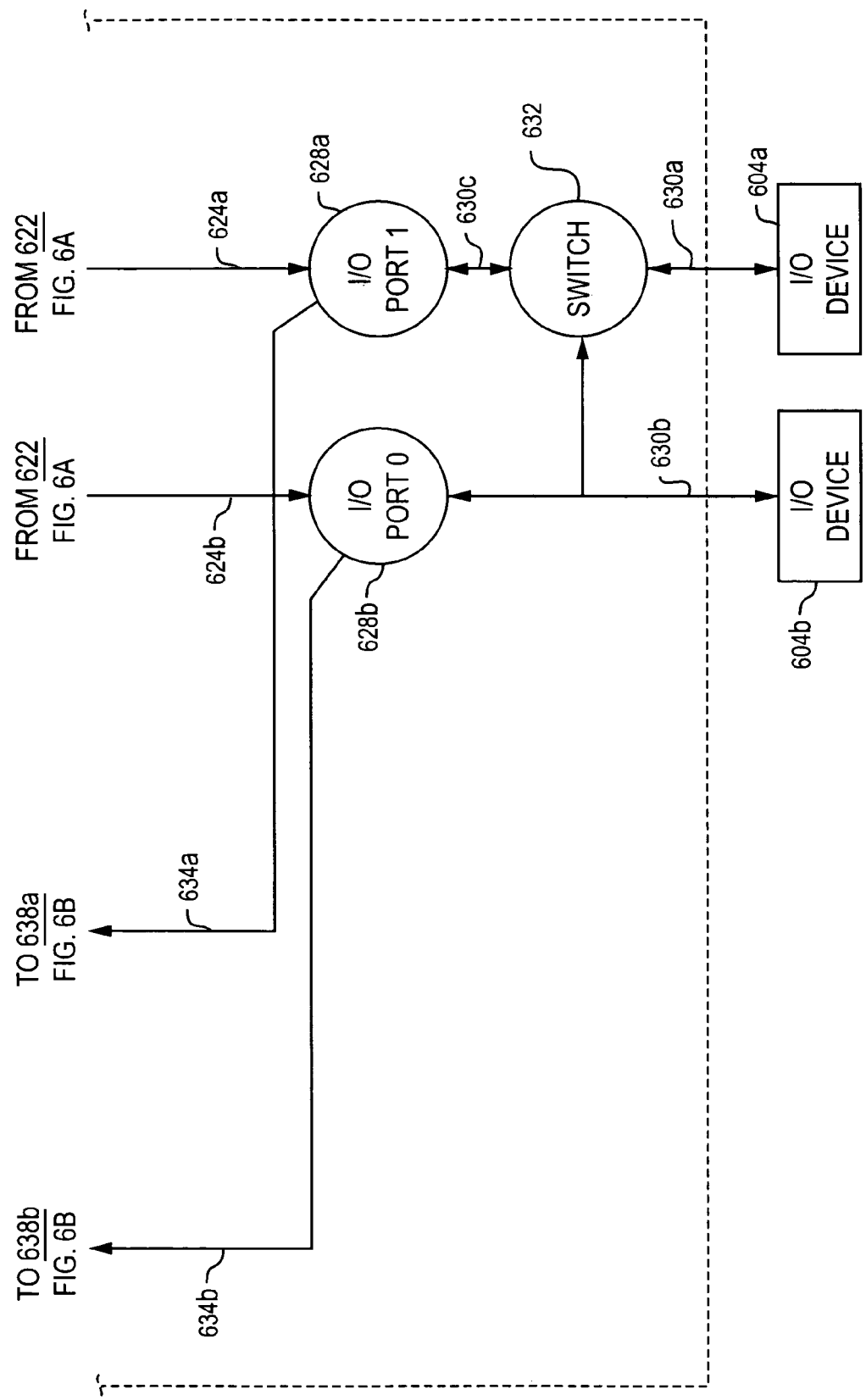

The term "resources" refers herein to hardware resources in a computer system, such as processor cores (FIG. 2) and I/O ports (FIG. 6A-6B). A chip may contain one or more hardware resources. Although processor cores and I/O ports are provided herein as examples of hardware resources that may individually be allocated to partitions in embodiments of the present invention, embodiments of the present invention may be used to allocate other kinds of hardware resources to partitions on a sub-chip basis. Furthermore, the techniques illustrated by the example in FIG. 2 are applied to a plurality of CPU cores 206a-n, such techniques may be applied to I/O ports or to any other kind of resource. Similarly, although the techniques illustrated by the example in FIGS. 6A-6B are applied to a plurality of I/O ports 628a-b, such techniques may be applied to CPU cores or to any other kind of resource.

In general, techniques disclosed herein may be used in system including a cache to allocate the cache among multiple partitions. Furthermore, any resource which is accessed using memory-mapped transactions may be allocated to a particular partition in a partitionable computer system using techniques disclosed herein.

For example, general purpose event registers (GPEs) typically are allocated to particular partitions. A particular GPE, therefore, typically is addressable within the address space of the partition to which it is allocated. Techniques disclosed herein may be employed to enable the GPEs of each partition accessible over the system fabric 116 at unique system (fabric) addresses.

Although certain examples provided above involving allocating a plurality of resources on a single chip (integrated circuit) to a plurality of partitions, the techniques disclosed herein are not limited to use in conjunction with resources on a single chip. Rather, more generally, techniques disclosed herein may be used to allocated a plurality of resources in a computer system to a plurality of partitions in the computer system.

Although only a single memory controller is shown in each of the cell boards 102a-d in FIG. 1, this is not a requirement of the present invention. Rather, a cell board may contain multiple memory controllers, each of which may have its own terminus ID. Those of ordinary skill in the art will appreciate how to implement embodiments of the present invention in systems including multiple memory controllers on a single cell board.

Although in the example illustrated in FIG. 2 the core 204a issues memory write command 230a, the memory write command 230a is just one example of a memory access request, which is in turn merely one example of a transaction to which the techniques disclosed herein may apply.

Although partition ID values are stored in partition ID registers 210a-n in FIG. 2, partition ID values may be represented and stored in any manner. For example, partition ID values need not each be stored in a distinct register and need not be represented using the particular numbering scheme described herein.

Although various embodiments of the present invention are described herein in conjunction with symmetric multiprocessor computer architectures (SMPs), embodiments of the present invention are not limited to use in conjunction with SMPs. Embodiments of the present invention may, for example, be used in conjunction with NUMA (non-uniform memory access) multiprocessor computer architectures.

Although four cell boards 102a-d are shown in FIG. 3, this is not a requirement of the present invention. Rather, the techniques disclosed herein may be used in conjunction with multiprocessor computer systems having any number of cell boards. Furthermore, each cell board in the system may have any number of processors (including one). The term "cell board" as used herein is not limited to any particular kind of cell board, but rather refers generally to any set of electrical and/or mechanical components that allow a set of one or more processors to communicate over a system fabric through an interface such as an agent chip.

Although the fabric agent chip 114a and memory controller 110 are illustrated as separate and distinct components in FIG. 1, this is not a requirement of the present invention. Rather, the fabric agent chip 114a and memory controller 110a may be integrated into a single chip package.

What is claimed is:

1. A partitionable computer system partitioned into a plurality of partitions, the computer system comprising an integrated circuit, the integrated circuit comprising:
 a first processor core allocated to a first one of the plurality of partitions, the first processor core comprising:
  means for outputting a first physical address in a first address space allocated to the first one of the plurality of partitions;
  first partition identification means for storing a first partition identification value identifying the first one of the plurality of partitions; and
  first bit substitution means, coupled to the first processor core and the first partition identification means, for producing a first partition-identifying address by appending the first partition identification value to the first physical address;

a second processor core allocated to a second one of the plurality of partitions that differs from the first one of the plurality of partitions;

a hardware resource coupled to the first and second processor cores;

means for transmitting the first partition-identifying address from the first bit substitution means to the hardware resource; and second partition identification means for storing a second partition identification value identifying the second one of the plurality of partitions;

wherein the first partition identification value has a first size and wherein the second partition identification value has a second size which differs from the first size; and wherein granularity of partitioning for the computer system is a single processor core.

2. The computer system of claim 1, further comprising an input/output (I/O) controller having multiple ports, wherein the ports are selectively mapped to different partitions.

3. The computer system of claim 1, further comprising:
a system fabric; and
means for transmitting the first partition-identifying address over the system fabric.

4. The computer system of claim 1, wherein the second processor core comprises means for outputting a second physical address in a second address space allocated to the second one of the plurality of partitions, and wherein the computer system further comprises: second bit substitution means, coupled to the second processor core and the second partition identification means, for producing a second partition-identifying address by storing the second partition identification value in at least part of the second physical address.

5. The computer system of claim 4, further comprising:
a system fabric; and
means for transmitting the second partition-identifying address over the system fabric.

6. The computer system of claim 1, further comprising:
an address mapper, coupled to the hardware resource, to map the first partition-identifying address into a first system address, the first system address including the first partition identification value.

7. The computer system of claim 1, further comprising:
a system fabric; and
means for transmitting the first system address over the system fabric.

8. The computer system of claim 1, wherein the first bit substitution means comprises means for storing a programmable size of the first partition identification value, and wherein the first partition identification value has the programmable size.

9. The computer system of claim 1, wherein the first one of the plurality of partitions is associated with a first partition identification value, wherein the second one of the plurality of partitions is associated with a second partition identification value, and wherein the computer system further comprises:

means for receiving a first transaction including a source terminus identifier, the source terminus identifier identifying a source device from which the incoming transaction was received;

means for identifying, based on the source terminus identifier, a third partition identification value identifying one of the first and second of the plurality of partitions;

first means for transmitting at least some of the first transaction to the first processor core if the third partition identification value is equal to the first partition identification value; and second means for transmitting at least some of the first transaction to the second processor core if the third partition identification value is equal to the second partition identification value.

10. The computer system of claim 9, wherein the first means for transmitting comprises means for transmitting at least some of the first transaction and the third partition identification value to the first processor core, and wherein the second means for transmitting comprises means for transmitting at least some of the first transaction and the third partition identification value to the second processor core.

11. The computer system of claim 2, wherein each port is associated with a different I/O device.

12. The computer system of claim 1, wherein the hardware resource comprises a cache.

13. A computer-implemented method for use in a computer system partitioned into a plurality of partitions, the computer system comprising an integrated circuit, the integrated circuit comprising a first processor core, a second processor core, and a hardware resource coupled to the first and second processor cores, the method comprising steps of:

(A) allocating the first processor core to a first one of the plurality of hardware partitions;

(B) outputting, within the first processor core, a first physical address in a first address space allocated to the first one of the plurality of partitions;

(C) storing, within the first processor core, a first partition identification value identifying the first one of the plurality of partitions;

(D) producing a first partition-identifying address by appending, within the first processor core, the first partition identification value to the first physical address (E) allocating the second processor core to a second one of the plurality of hardware partitions, wherein granularity of partitioning for the computer system is a single processor core;

wherein step (B) further comprises:

(B) (1) receiving from the second processor core a second physical address in a second address space allocated to the second one of the plurality of partitions; and (B) (2) producing a second partition-identifying address by storing, in at least part of the second physical address, a second partition identification value identifying the second one of the plurality of partitions; and wherein the first partition identification value has a first size and wherein the second partition identification value has a second size which differs from the first size.

14. The method of claim 13 further comprising selectively mapping different ports of an input/output (I/O) controller to different partitions.

15. The method of claim 13, further comprising a step of:
(A) (3) transmitting the first partition-identifying address over a system fabric.

16. The method of claim 13, further comprising a step of:

(B) (3) transmitting the second partition-identifying address over a system fabric.

17. The method of claim 13, wherein the step (A) further comprises a step of:

(A) (4) mapping the first partition-identifying address into a first system address, the first system addressing including the first partition identification value.

18. The method of claim 17, wherein the step (A) further comprises a step of:

(A) (5) transmitting the first system address to a system fabric.

19. The method of claim 13, wherein the physical address comprises a used portion and an unused portion, and wherein step (A) (2) comprises a step of storing the first partition identification value in the used portion of the physical address.

20. The method of claim 13, wherein the first one of the plurality of partitions is associated with a first partition identification value, wherein the second one of the plurality of partitions is associated with a second partition identification value, and wherein step (A) comprises steps of:

(A) (1) receiving a first transaction including a source terminus identifier, the source terminus identifier identifying a source device from which the incoming transaction was received;

(A) (2) identifying, based on the source terminus identifier, a third partition identification value identifying one of the first and second of the plurality of partitions;

(A) (3) transmitting at least some of the first transaction to the first processor core if the third partition identification value is equal to the first partition identification value; and (A) (4) transmitting at least some of the first transaction to the second processor core if the third partition identification value is equal to the second partition identification value.

21. The method of claim 13, wherein the hardware resource comprises a cache.

22. The method of claim 20, wherein step (A) (3) comprises transmitting at least some of the first transaction and the third partition identification value to the first processor core, and wherein step (A) (4) comprises transmitting at least some of the first transaction and the third partition identification value to the second processor core.

* * * * *

UNITED STATES PATENT AND TRADEMARK OFFICE
CERTIFICATE OF CORRECTION

PATENT NO. : 7,606,995 B2  Page 1 of 1
APPLICATION NO. : 10/898590
DATED : October 20, 2009
INVENTOR(S) : Russ Herrell et al.

It is certified that error appears in the above-identified patent and that said Letters Patent is hereby corrected as shown below:

In column 18, line 41, in Claim 13, delete "address" and insert -- address; --, therefor.

Signed and Sealed this

Nineteenth Day of January, 2010

David J. Kappos
*Director of the United States Patent and Trademark Office*